United States Patent Office 3,651,132
Patented Mar. 21, 1972

---

3,651,132
CARNITINE SALTS OF N,N-DIMETHYLBIGUANIDE HYDROHALIDES AND MANUFACTURING THE SAME
Tadahiro Dohi and Taneyoshi Yu, Naruto-shi, Takayuki Nakagawa, Tokushima-shi, and Kozi Hiraoka, Naruto-shi, Japan, assignors to Otsuka Pharmaceutical Company Limited, Tokyo-to, Japan
No Drawing. Filed May 27, 1969, Ser. No. 828,372
Int. Cl. C07c 101/00
U.S. Cl. 260—501.13
2 Claims

ABSTRACT OF THE DISCLOSURE

The carnitine salts of N,N-dimethylbiguanide hydrohalides having the formula:

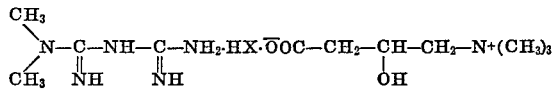

wherein X is a halogen atom. The present compounds are useful as anti-diabetic drugs.

---

This invention relates to a novel biguanide derivative having excellent effects in the reduction of blood sugar.

The biguanide derivatives of the invention are carnitine salts of the N,N-dimethylbiguanide hydrohalides having the following formula:

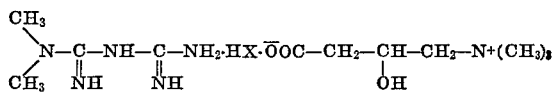

wherein X is a halogen atom.

While it is known that N,N-dimethylbiguanide hydrochloride reduces blood sugar and is clinically applied as an anti-diabetic drug, it has relatively high toxicity on the human body and brings about secondary effects such as gastroenteric troubles. According to the investigation of the present inventors it has been found that the present carnitine salts of the N,N-dimethylbiguanide hydrohalides display better reduction of blood sugar and have lower toxicity as compared with N,N-dimethylbiguanide hydrochloride.

The carnitine salts of N,N-dimethylbiguanide hydrohalides of the invention are stable compounds in the form of solids at room temperature. Every carnitine salt of the N,N-dimethylbiguanide hydrohalides has the above effects and is included in the present compounds, but the N,N-dimethylbiguanide hydrochloride salt is most desirable in the invention.

The present compounds may be prepared by various methods. According to one preferred method it is produced by reacting free N,N-dimethylbiguanide or a hydrohalide acid salt thereof with carnitinebetaine or carnitine hydrohalide in about stoichiometric amounts. The carnitine used includes l-, d- or dl-carnitine. This reaction may be carried out in the presence of solvents. Examples of the preferred solvents are water, methanol, ethanol, etc., and they may be used alone or in mixture. The reaction may be preferably conducted under reflux conditions, though room temperatures may be applied. The present carnitine salt thus prepared may be easily separated from the resultant reaction mixture by filtration and recrystallization.

For better understanding of the invention examples are given below.

EXAMPLE 1

In 120 milliliters of warm methanol were dissolved 16.5 grams of N,N-dimethylbiguanide hydrochloride and 16.1 grams of l-carnitinebetaine and the resultant solution was refluxed for one hour. After cooling to room temperature 50 milliliters of acetone and 330 milliliters of ether were added to the resultant reaction mixture. Said reaction mixture was cooled to precipitate crude crystals. The precipitated crystals were separated by filtration and dissolved in 90 milliliters of warm ethanol. The recrystallization thereof with 180 milliliters of ether gave 29 grams of l-carnitine salt of N,N-dimethylbiguanide hydrochloride.

The specific rotatory power of the resultant compound was as follows;

$$[\alpha]_D^{20} = -13.0° \ (c.=2\text{—water})$$

Analysis of the resultant compound gave the following results:

Calcd. for $C_{11}H_{27}O_3N_6Cl$ (percent): C, 40.42; H, 8.33; N, 25.72. Found (percent): C, 40.31; H, 8.36; N, 25.85.

The toxicity and reduction of blood sugar of the compound thus obtained are shown below with the results of N,N-dimethylbiguanide hydrochloride for comparative purposes, in which the oral toxicity on mice and reduction of blood sugar were determined by administering the compound to 5 mice suffering from alloxane diabetes in the proportion of 50 mg./kg. and measuring the variation of average blood sugar value compared with that before administration; the value before administration being 100 percent.

|  |  | Reduction of blood sugar percent | | |
|---|---|---|---|---|
|  | LD$_{50}$ (mg./kg.) | 2 hrs. after admn. | 4 hrs. after admn. | 6 hrs. after admn |
| N,N-dimethylbiguanide hydro chloride | 750 | 75 | 66 | 58 |
| l-carnitine salt of N,N-dimethyl-biguanide hydrochloride | 7,500 | 63 | 48 | 33 |

From the above results it is seen that the l-carnitine salt of N,N-dimethylbiguanide hydrochloride displays better reduction of blood sugar as compared with N,N-dimethylbiguanide hydrochloride, while the toxicity of the former is as low as 1/10 as that of the latter.

EXAMPLE 2

In 150 milliliters of warm ethanol were dissolved 16.5 grams of N,N-dimethylbiguanide hydrochloride and 16.1 grams of dl-carnitinebetaine and the resultant solution was refluxed for one hour. After cooling to room temperature 300 milliliters of ether were added to the resultant reaction mixture and kept at 5° C. in an ice room to precipitate crude crystals. After filtration the crystals were recrystallized with ethanol and ether in the same manner as in Example 1, whereby 29.2 grams of dl-carnitine salt of N,N-dimethylbiguanide hydrochloride were obtained.

Analysis of the resultant product gave the following result:

Found (percent): C, 40.33; H, 8.45; N, 25.61.

EXAMPLE 3

In 100 milliliters of warm ethanol were dissolved 19.2 grams of free N,N-dimethylbiguanide and 19.8 grams of l-carnitine hydrochloride and the resultant solution was refluxed for one hour. After cooling to room temperature 100 milliliters of ether was added to the resultant reaction mixture and kept in an ice room. The crude crystals thus obtained were recrystallized with ethanol and ether in the same manner as in Example 1, whereby 28 grams of l-carnitine hydrochloride salt of N,N-dimethylbiguanide were obtained.

The specific rotatory power of the resultant compound was as follows:

$$[\alpha]_D^{20} = -13.2° \quad c.=2-\text{water})$$

Analysis gave the following results:
Found (percent): C, 40.54; H, 8.20; N, 25.59.

What we claim:

1. A carnitine salt of a N,N-dimethylbiguanide hydrohalide having the formula:

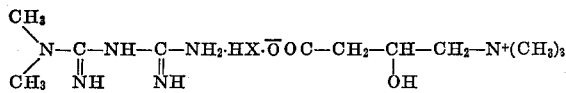

wherein X is a halogen atom.

2. The carnitine salt of N,N-dimethylbiguanide, hydrochloride according to claim 1.

References Cited

Chemical Abstracts, vol. 61, columns 11900–1190 (1964).

BERNARD HELFIN, Primary Examiner

GERALD A. SCHWARTZ, Assistant Examiner

U.S. Cl. X.R.

260—999